US012359108B1

United States Patent
Pearl et al.

(10) Patent No.: US 12,359,108 B1
(45) Date of Patent: Jul. 15, 2025

(54) WELLBORE SERVICING COMPOSITIONS CONTAINING A LATEX ADDITIVE

(71) Applicant: Halliburton Energy Services, Inc., Houston, TX (US)

(72) Inventors: William Cecil Pearl, Houston, TX (US); Travis Allen Patterson, Houston, TX (US); Samuel J. Lewis, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/403,094

(22) Filed: Jan. 3, 2024

(51) Int. Cl.
  *E21B 21/00* (2006.01)
  *C09K 8/12* (2006.01)
  *C09K 8/42* (2006.01)

(52) U.S. Cl.
  CPC ............... *C09K 8/12* (2013.01); *C09K 8/424* (2013.01); *C09K 8/426* (2013.01); *E21B 21/003* (2013.01)

(58) Field of Classification Search
  None
  See application file for complete search history.

(56) References Cited

U.S. PATENT DOCUMENTS

| | | | |
|---|---|---|---|
| 5,588,488 A * | 12/1996 | Vijn | C09K 8/46 106/724 |
| 6,258,757 B1 * | 7/2001 | Sweatman | C09K 8/508 507/221 |
| 6,620,775 B2 | 8/2003 | Winston et al. | |
| 8,343,896 B2 | 1/2013 | Eoff et al. | |
| 9,296,939 B2 | 3/2016 | Iverson et al. | |
| 2002/0103291 A1 | 8/2002 | Westerman | |
| 2008/0300150 A1 | 8/2008 | Reddy et al. | |
| 2008/0300151 A1 | 12/2008 | Melbouci et al. | |
| 2009/0176667 A1 | 7/2009 | Nguyen | |
| 2010/0036017 A1 | 2/2010 | Eoff et al. | |
| 2011/0275736 A1 | 11/2011 | Iverson et al. | |
| 2012/0138299 A1 * | 6/2012 | Joseph | C04B 28/06 166/293 |

(Continued)

FOREIGN PATENT DOCUMENTS

WO  2017015185 A1  1/2017

OTHER PUBLICATIONS

Filing Receipt, Specification and Drawings for U.S. Appl. No. 18/403,098, entitled "Wellbore Servicing Compositions Containing a Latex Additive," filed Jan. 3, 2024, 36 pages.

(Continued)

*Primary Examiner* — Andrew Sue-Ako
(74) *Attorney, Agent, or Firm* — Conley Rose, P.C.; Rodney B. Carroll (57) ABSTRACT

A liquid additive composition comprising (i) a biopolymer gum and (ii) a latex, wherein a ratio of biopolymer gum to latex ranges from about 1:50 to about 1:500. A method of preparing a liquid additive composition comprising contacting a biopolymer gum and a latex to form a mixture wherein a ratio of biopolymer gum to latex ranges from about 1:60 to about 1:500. A method of servicing a wellbore penetrating a subterranean formation comprising placing a treatment fluid comprising (i) a biopolymer gum and (ii) a latex into the wellbore and/or the subterranean formation, wherein a ratio of biopolymer gum to latex ranges from about 1:50 to about 1:500.

22 Claims, 2 Drawing Sheets

(56) References Cited

U.S. PATENT DOCUMENTS

| | | |
|---|---|---|
| 2013/0319667 A1* | 12/2013 | Chen ................ E21B 43/26 |
| | | 507/224 |
| 2014/0162910 A1 | 6/2014 | Braley et al. |
| 2014/0374097 A1 | 12/2014 | Morgan et al. |
| 2015/0114649 A1* | 4/2015 | Osorio ................ C09K 8/44 |
| | | 166/305.1 |
| 2017/0183556 A1* | 6/2017 | Agapiou ............. C04B 28/34 |
| 2019/0048247 A1 | 2/2019 | Pernites et al. |
| 2019/0218445 A1* | 7/2019 | Pernites ............. C09K 8/46 |
| 2022/0363972 A1 | 11/2022 | Jones et al. |

OTHER PUBLICATIONS

Foreign Communication from Related Application—International Search Report and Written Opinion of the International Searching Authority, International Application No. PCT/US2024/010870, dated Sep. 26, 2024, 11 pages.

Foreign Communication from Related Application—International Search Report and Written Opinion of the International Searching Authority, International Application No. PCT/US2024/010863, dated Sep. 26, 2024, 11 pages.

* cited by examiner

WELLBORE SERVICING COMPOSITIONS CONTAINING A LATEX ADDITIVE

FIELD

This application relates generally to a wellbore servicing fluid that can be used in the recovery of natural resources from a wellbore penetrating a subterranean formation. More particularly, the disclosure relates to fluid loss additives comprising latex and their use in wellbore serving fluids and related wellbore servicing operations.

BACKGROUND

In wellbore servicing operations, numerous additives can be included in wellbore fluids to provide one or more user desired functionalities. For example, fluid loss additives are chemical additives used to control the loss of fluid to the subterranean formation, for example reducing fluid loss attributable to filtration from the wellbore into the surrounding subterranean formation. In wellbore servicing operations, loss of fluid to the formation can detrimentally affect the performance of wellbore servicing fluids, the permeability of the formation, and the economics of the operation. For example, loss of fluid can lead to increased slurry gelation, a consequent drop in annular pressure and loss of filtrate volume providing space for gas entry. Also, poor fluid loss control may lead to higher permeability filtercakes which influences the gas migration path.

Latex is a commonly used fluid loss additive that typically suffers from a poor dosage response relationship such that large amounts of these materials are needed to provide the level of fluid loss desired. In oilfield operations having limited space (e.g., offshore platforms) this poor dosage response relationship results in a space demand for these materials that can be a logistical challenge. Thus, there exists an ongoing need for latex-containing fluid loss additives exhibiting improved fluid loss performance properties.

SUMMARY

Disclosed herein is a liquid additive composition comprising (i) a biopolymer gum and (ii) a latex, wherein a ratio of biopolymer gum to latex ranges from about 1:50 to about 1:500.

Also disclosed herein is a method of preparing a liquid additive composition comprising contacting a biopolymer gum and a latex to form a mixture wherein a ratio of biopolymer gum to latex ranges from about 1:60 to about 1:500.

Also disclosed herein is a method of servicing a wellbore penetrating a subterranean formation comprising placing a treatment fluid comprising (i) a biopolymer gum and (ii) a latex into the wellbore and/or the subterranean formation, wherein a ratio of biopolymer gum to latex ranges from about 1:50 to about 1:500.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more aspects are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Herein all weight percentages are based on the total weight of the composition disclosed unless otherwise indicated.

Disclosed herein are latex-containing fluid loss additive compositions, designated LC-FLAC. In one or more embodiments, the LC-FLAC comprises (i) one or more latexes and (ii) one or more biopolymers. In some embodiments, the LC-FLAC comprises a solvent. Also disclosed herein are treatment fluids comprising a LC-FLAC. In one or more embodiments, the treatment fluid is a cementitious slurry, a drilling mud or a spacer fluid. Further disclosed herein are methods of servicing a wellbore using treatment fluids comprising a LC-FLAC.

In one or more embodiments, the LC-FLAC comprises a latex. As used herein, "latex" refers to a stable emulsion of dispersed solid polymer microparticles in a liquid (e.g., an aqueous fluid), also referred to as a colloidal dispersion of solid polymer particles in a liquid (e.g., an aqueous fluid). In one or more aspects, the latex is an aqueous latex and the amount of polymer solids in the aqueous latex can range from about 25 weight percent (wt. %) to about 75 wt. %, alternatively from about 30 wt. % to about 70 wt. %, alternatively from about 40 wt. % to about 60 wt. %, or alternatively about 40, 41, 42, 43, 44, 45, 46, 47 wt. %, 48, 49, 50, 51, 52, 53, 54, 55, 56, 57, 58, 59, 60 wt. % or any range thereof with the remaining being the aqueous fluid. The latex can be formed by polymerization of monomers in an emulsion polymerization process that forms the dispersed polymer microparticles in the liquid (e.g., aqueous fluid). In some embodiments, the solid latex polymer comprises repeating units formed from ethylene, propylene, styrene, butadiene, nitrile, neoprene, polybutadiene, acrylonitrile, isoprene, polyisoprene, 2-acrylamido-2-methylpropane sulfonic acid, or combinations thereof. Suitable latex polymers may include carboxylated nitrile butadiene rubber (XNBR), styrene-butadiene rubber (SBR), polychloroprene (Neoprene), acrylonitrile butadiene rubber (NBR), butyl rubber, ethylene propylene diene monomer (EPDM), polyvinylidene chloride (PVDC), or combinations thereof.

In embodiments, an aqueous phase of the emulsion comprises a colloidal dispersion of a styrene-butadiene 2-acrylamido-2-methylpropane sulfonic acid copolymer. In such embodiments, the weight ratio of styrene to butadiene may range from about 10:90 to about 90:10, alternatively from about 20:80 to about 80:20 or alternatively from about 25:75 to about 75:25. A nonlimiting example of a styrene-butadiene latex suitable for use in the present disclosure is commercially available from Halliburton Energy Services under the name Latex 3000™ cement additive.

In one or more embodiments, the latex solution (i.e., polymer solids and aqueous fluid) is present in the LC-FLAC in an amount of from about 90 wt. % to about 99.9 wt. %, alternatively from about 92 wt. % to about 99 wt. %, alternatively from about 98 wt. % to about 99 wt. %, or alternatively about 90, 91, 92, 93, 94, 95, 96, 97, 98, 99 wt. % or any range thereof. In one or more embodiments, the LC-FLAC comprises (i) about 99 wt. % of a latex solution wherein the latex solution provides about 45 wt. % polymer solids and about 54 wt. % aqueous fluid to the LC-FLAC and (ii) about 1 wt. % of a biopolymer gum.

In embodiments, the LC-FLAC comprises a biopolymer (e.g., a naturally occurring polymer), alternatively a biopolymer gum (e.g., a naturally occurring gum). A biopolymer gum suitable for use in the present disclosure may be a microbial polymer. Herein a microbial polymer refers to biopolymers synthesized by microorganisms such as bacteria. In embodiments, the biopolymer gum comprises an anionic extracellular polysaccharide derived from one or more polysaccharide monomers. In such embodiments, the one or more polysaccharide monomers comprise glucose, mannose, glucoronic acid, rhamnose, maltotriose, galactose or combinations thereof.

In some embodiments, the biopolymer gum has a weight average molecular weight ranging from about $1 \times 10^5$ g/mol to about $1 \times 10^7$ g/mol, alternatively from about $1 \times 10^6$ g/mol to about $6 \times 10^6$ g/mol or alternatively from about $6 \times 10^6$ g/mol to about $1 \times 10^7$ g/mol. The weight average molecular weight (Mw) may be calculated according to equation 1:

$$\overline{M}_w = \frac{\sum_i N_i M_i^2}{\sum_i N_i M_i} \quad (1)$$

where $N_i$ is the number of molecules of molecular weight $M_i$.

Nonlimiting examples of biopolymer gums suitable for use in the present disclosure include xanthan gum, welan gum, diutan gum, guar gum, pullulan gum, curdlan gum, gellan gum, or combinations thereof. In embodiments, the biopolymer gum comprises diutan gum. A biopolymer gum may be present in an LC-FLAC in an amount ranging from about 0.1 wt. % to about 10 wt. %, alternatively from about 1 wt. % to about 5 wt. %, alternatively from about 1 wt. % to about 2 wt. %, or alternatively about 0.1, 0.5, 1, 1.5, 2, 2.5, 3, 3.5, 4, 4.5, 5, 6, 7, 8, 9, 10 wt. % or any range thereof, based on the total weight of the LC-FLAC.

In embodiments, the LC-FLAC is formulated to provide a ratio of biopolymer gum to latex that ranges from about 1:50 to about 1:500, alternatively about 1:50 to about 1:400, alternatively from about 1:50 to about 1:200 or alternatively about 1:50.

In one or more embodiments, the LC-FLAC may be in liquid form (e.g., formulated as a liquid additive composition). As a nonlimiting example, the LC-FLAC formulated as a liquid additive includes an aqueous fluid. Aqueous fluids that may be suitable for use in the methods and systems may include water from any source. Such aqueous fluids may include fresh water, salt water (e.g., water containing one or more salts dissolved therein), brine (e.g., saturated salt water), seawater, or any combination thereof. In many embodiments, the aqueous fluids include one or more ionic species, such as those formed by salts dissolved in water. For example, seawater and/or produced water may include a variety of divalent cationic species dissolved therein. In various aspects, the aqueous fluid component of the LC-FLAC liquid additive comprises fresh water, surface water, ground water, produced water, sea water, salt water, brine, or combinations thereof.

A liquid (e.g., aqueous fluid) may be included in the LC-FLAC in any suitable amount to meet one or more process or application goals. In embodiments, the liquid (e.g., aqueous fluid) comprises the remainder of the LC-FLAC once all other components are accounted for. In some embodiments of the LC-FLAC, the aqueous component of the latex serves as a solvent for the biopolymer gum without the introduction of additional aqueous fluid or another solvent to the composition. In an aspect, the LC-FLAC is formulated as a liquid additive wherein the biopolymer gum dissolves in the aqueous fluid of the latex and the latex polymer solids remain suspended in the aqueous fluid.

In one or more embodiments, the LC-FLAC comprises one or more additives effective to meet one or more user and/or process goals. For example, the LC-FLAC may include materials such as biocides and surfactants. In some embodiments the LC-FLAC comprises one or more emulsifying surfactants, sulfosuccinates, ethoxylates or combinations thereof. Effective amounts of these additives may be included singularly or in combination using any suitable methodology.

An LC-FLAC of the type disclosed herein may be prepared by contacting the components (e.g., latex, biopolymer gum, optional solvent) in an appropriate vessel under conditions suitable for the formation of a mixture. In some embodiments, an LC-FLAC of the type disclosed herein is prepared as a mixture in any suitable form (e.g., liquid additive composition) that is transported to a well site. In such embodiments, the LC-FLAC as a liquid additive composition may advantageously provide for a fluid loss additive as a single, pre-mixed formulation.

In one or more embodiments, a LC-FLAC comprises an aqueous latex and from about 0.1 to about 10 weight percent biopolymer gum, from about 40 to about 50 weight percent latex polymer solids, and from about 40 to about 55 weight percent water, all percentages based on the total weight of the LC-FLAC.

In some embodiments, a LC-FLAC formulated as a liquid additive composition is introduced one or more additional components to provide a wellbore servicing fluid (WSF), and the composition is mixed until the LC-FLAC is distributed throughout the WSF. By way of example, the LC-FLAC liquid additive and components of the WSF may be mixed using a mixer, a blender, a stirrer, a jet mixing system, or other suitable device.

A LC-FLAC of the present disclosure may be included in a WSF and subsequently introduced to a wellbore. A wellbore is a hole that extends from a surface to a location below the surface. The surface may be on dry land or below water (e.g., sub-sea). The wellbore can permit access as a pathway between the surface and a hydrocarbon-bearing formation. The wellbore, defined and bound along its operative length by a wellbore wall, extends from a proximate end at the surface, through the subsurface, and into the hydrocarbon-bearing formation, where it terminates at a distal wellbore face. The wellbore forms a pathway capable of permitting both fluid and apparatus to traverse between the surface and the hydrocarbon-bearing formation.

During drilling of a wellbore, a wellbore servicing fluid (e.g., drilling fluid or drilling mud) present in the wellbore can function for several purposes, including well control (hydraulic pressure against the fluids in the hydrocarbon-bearing formation), wellbore wall integrity and stabilization (hydraulic pressure on the wellbore wall; provide loss control additives), circulation and removal of drill cuttings, and lubricity to the drilling assembly. In embodiments, the wellbore servicing fluid comprising a liquid fluid loss additive of the type described herein (i.e., LC-FLAC) is a drilling fluid (mud). A drilling mud may be an oil-based mud (OBM) or a water-based mud (WBM). The drilling mud may comprise a base fluid such as water, oil, or synthetic compounds (e.g., OBM, WBM, or emulsion), and various additives. Water-based muds often include water as the major component, with clays, such as bentonite, serving as viscosifiers. Oil-based muds use diesel, mineral oil, or synthetic oils as the base. Weighting agents like barite are added to increase density, controlling formation pressures and stabilizing the wellbore. Other common additives are calcium carbonate for pH control and weight reduction, and various polymers for fluid loss control and viscosity enhancement. Lubricants and biocides are also included to reduce friction and prevent microbial growth, respectively.

The wellbore usually contains at least a portion of at least one fluid conduit that links the interior of the wellbore to the surface. Nonlimiting examples of such fluid conduits include casing, liners, pipes, tubes, coiled tubing and mechanical structures with interior voids. A fluid conduit connected to the surface is capable of permitting regulated fluid flow and access between equipment on the surface and the interior of the wellbore. Nonlimiting examples of equipment connected at the surface to the fluid conduit include pipelines, tanks, pumps, compressors and flares. The fluid conduit may permit the introduction and removal of mechanical devices, including tools, drill strings, sensors and instruments, into and out of the interior of the wellbore. In some embodiments, the wellbore servicing fluid comprising a liquid fluid loss additive of the type described herein is a cementitious composition used to secure a conduit in place within the wellbore to provide zonal isolation, also referred to as primary cementing.

Subsequent to drilling, the wellbore may be cemented using any suitable cementitious composition. However, direct contact between incompatible fluids (e.g., a water-based cement slurry and OBM) can result in detrimental fluid interactions that can jeopardize wellbore operations. For example, intermingling of incompatible fluids can create emulsions between the fluids. These emulsions, which resist fluid movement upon the application of force, raise the viscosity profile of the wellbore fluid. An increase in wellbore fluid viscosity typically results in an increasing pumping head pressure to maintain a constant fluid circulation rate in the wellbore. The increased pressure can result in damage to the formation downhole if that pressure exceeds the fracture gradient of the formation. In order to prevent such undesirable intermingling, a spacer fluid may be used (e.g., a spacer fluid placed between a drilling mud and a cementitious composition).

In various embodiments, fluids in wellbore servicing operations are separated using a spacer fluid. Herein a spacer fluid refers to any liquid used to physically separate one wellbore servicing fluid from another where the spacer fluid is typically compatible with the individual fluids being separated. In embodiments, a spacer fluid comprises the liquid fluid loss additive described herein (i.e., LC-FLAC) in combination with a base fluid, one or more surfactants, one or more weighting agents, one or more viscosifiers or combinations thereof.

In embodiments, subsequent to introduction of a spacer fluid, a cement slurry may be introduced to the wellbore. For example, primary cementing may be carried out to secure a portion of a fluid conduit between the wellbore interior and a surface wall of the wellbore. Upon positioning the fluid conduit in a desirable location in the wellbore, introducing cement slurry into the wellbore fills at least a portion of the wellbore annulus. When the cement slurry cures, the cement physically and chemically bonds with both the exterior surface of the fluid conduit and the wellbore wall, coupling the two. In addition, the solid cement provides a physical barrier that prohibits gases and liquids from migrating from one side of the solid cement to the other via the wellbore annulus.

In embodiments, the cement slurry comprises a cementitious material such as a hydraulic cement. A variety of hydraulic cements may be utilized in accordance with the present disclosure, including, but not limited to, those comprising calcium, aluminum, silicon, oxygen, iron, and/or sulfur, which set and harden by reaction with water. Non-limiting examples of hydraulic cements suitable for use in the present disclosure include Portland cements (e.g., classes A, B, C, G, and H Portland cements), pozzolana cements, gypsum cements, phosphate cements, high alumina content cements, silica cements, high alkalinity cements, shale cements, acid/base cements, magnesia cements such as Sorel cements, fly ash cement, zeolite cement systems, cement kiln dust cement systems, slag cements, micro-fine cement, metakaolin, and combinations thereof.

In embodiments, "high alumina content cement" refers to a cement having an alumina concentration in the range of from about 40 wt. % to about 80 wt. % by a weight of the high alumina content cement. Silica cement can be formed when phosphoric acid displaces metal ions from an alumina-silica glass, containing metal oxides and fluorides. Portland cements can be classified as Classes A, C, H, and G cements according to American Petroleum Institute, *API Specification for Materials and Testing for Well Cements*, API Specification 10, Fifth Ed, Jul. 1, 1990. In addition, hydraulic cements may include cements classified by American Society for Testing and Materials (ASTM) in C150 (Standard Specification for Portland Cement), C595 (Standard Specification for Blended Hydraulic Cement) or C1157 (Performance Specification for Hydraulic Cements) such as those cements classified as ASTM Type I, II, III, IV, or V.

Without limitation, the hydraulic cement may be included in the cementitious slurry in an amount between any of and/or including any of about 10%, about 15%, about 20%, about 25%, about 30%, about 35%, about 40%, about 45%, about 50%, about 55%, about 60%, about 65%, about 70%, about 75%, about 80% or any range thereof based on the total weight of the cement slurry.

The cement slurry can include a base fluid such as an aqueous fluid. Generally, the aqueous fluid may be from any source, provided that it does not contain an amount of components that may undesirably affect the other components of the slurry. For example, the aqueous fluid can comprise fresh water, surface water, ground water, produced water, salt water, sea water, brine (e.g., underground natural brine, formulated brine, etc.), or a combination thereof.

In some embodiments, the aqueous fluid includes a brine. In one or more embodiments, the brine includes monovalent or divalent salts such as, sodium chloride, sodium bromide, potassium bromide, potassium chloride, magnesium chloride, calcium chloride, calcium bromide, potassium formate, cesium formate, lithium chloride, lithium bromide, sodium formate, lithium formate, ammonium chloride, tetramethyl ammonium chloride, choline chloride, potassium acetate, or a combination thereof. A formulated brine may be produced by dissolving one or more soluble salts in water, a natural brine, or sea water. The brine can be saturated or unsaturated.

The aqueous fluid may be added to the cementitious slurry in an amount effective to provide a pumpable slurry, such as a slurry having desired (e.g., job or service specific) rheological properties. In some embodiments, the aqueous fluid may be present within the cement slurry in an amount of from about 20% to about 180% by weight of cement (bwoc), alternatively from about 20% to about 100% bwoc, or alternatively from about 40% to about 80% bwoc.

In some embodiments, the cement slurry further comprises one or more additives or modifying agents as deemed necessary to impart desired physical properties. Such additives may include but are in no way limited to resins, stabilizers, silica, microspheres, aqueous superabsorbers, viscosifying agents, suspending agents, dispersing agents, salts, accelerants, surfactants, retardants, defoamers, settling-prevention agents, weighting materials, elastomers, vitrified shale, gas migration control additives, formation conditioning agents, or combinations thereof. Effective amounts of these additives may be included singularly or in combination using any suitable methodology. In some embodiments, the cement slurry may have a density of from about 7 pounds per gallon (ppg) to about 20 ppg, alternatively from about 10 ppg to about 18 ppg, or alternatively from about 13 ppg to about 17 ppg.

Herein wellbore servicing fluids of the type disclosed (e.g., spacer fluids, muds, cement slurry), collectively termed "treatment fluids," further comprise a LC-FLAC. In embodiments, a LC-FLAC is included in a drilling mud. In other embodiments, the LC-FLAC is included in a spacer fluid. In yet other embodiments, the LC-FLAC is included in a cementitious composition. In such embodiments, the treatment fluid may have a final liquid amount that is the sum of liquid present in the individual components used to prepare the treatment fluid. For example, a cementitious slurry comprising a LC-FLAC may have aqueous fluid present due to the latex component of the LC-FLAC and due to the aqueous fluid used to hydrate the cement. In such embodiments, the LC-FLAC may be present in a treatment fluid in an amount of from about 1 wt. % to about 30 wt. %, alternatively from about 2 wt. % to about 25 wt. % or alternatively from about 5 wt. % to about 20 wt. % based on total weight of the treatment fluid.

In embodiments, the treatment fluid can be prepared using any suitable method. In one or more embodiments, the method of preparing a treatment fluid includes mixing components (e.g., a cementitious material, LC-FLAC) using mixing equipment (e.g., a jet mixer, re-circulating mixer, a batch mixer, a blender, a mixing head of a solid feeding system) to form a pumpable slurry (e.g., a homogeneous fluid). Any container(s) that is compatible with the components of the treatment fluid and has sufficient space can be used for mixing.

In one or more embodiments, mixing the components of the treatment fluid can be on-the-fly (e.g., in real time or on-location). In some embodiments, the mixing equipment may be disposed on one or more trucks. In some embodiments, a jet mixer may be used, for example, to continuously mix components of the treatment fluid as it is being pumped to the wellbore. In one or more embodiments, a re-circulating mixer and/or a batch mixer may be used to mix a first group of components of the treatment fluid and a second group of components of the treatment fluid may be added to the mixer prior to pumping the wellbore servicing fluid downhole. Additionally, batch mixer type units for the first group of components may be plumbed in line with a separate tank containing the second group of components. The second group of components may then be fed in-line with the first group of components as it is pumped out of the mixing unit.

The treatment fluid can be prepared at a wellsite or remote from a wellsite. For example, some components of the treatment fluid (e.g., a cementitious material, LC-FLAC) can be transported to the wellsite and combined (e.g., mixed/blended) with an aqueous fluid located proximate the wellsite to form the treatment fluid. The aqueous fluid can be conveyed from a source (e.g., sea) to the wellsite or be available at the wellsite prior to the combining. Some components can be prepared at a location remote from the wellsite and transported to the wellsite, and, if necessary, stored at the on-site location. When it is desirable to prepare the treatment fluid at the wellsite, the components along with additional aqueous fluid and optional other additives can be mixed to form a mixture (e.g. in a blender tub, for example mounted on a trailer).

The method disclosed herein can further include placing the treatment fluid into a wellbore penetrating at least a portion of a subterranean formation. In embodiments, placing the treatment fluid into the subterranean formation uses one or more pumps.

In one or more embodiments, a method of the present disclosure comprises placing into a wellbore a treatment fluid comprising a cementitious material, water and a LC-FLAC of the type disclosed herein. The method may further comprise allowing the fluid to set.

In embodiments, a treatment fluid of the type disclosed herein (e.g., cementitious slurry comprising a LC-FLAC) has a reduction in fluid loss of from about 10% to about 80%, alternatively from about 25% to about 80% or alternatively from about 50% to about 80% when compared to the fluid loss observed in the presence of a latex fluid loss additive without a biopolymer gum. In some embodiments, a treatment fluid comprises a cement slurry and a LC-FLAC having a ratio of biopolymer gum:latex of about 1:225. In such embodiments, the treatment fluid has a fluid loss that is reduced by about 70% when compared to the fluid loss observed in the absence of the biopolymer gum. Fluid loss may be measured according to American Petroleum Institute (API) Specification IOA, 23rd Edition, April 2002.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

The effect of a LC-FLAC in cement slurries was investigated. Specifically, a cement slurry was prepared that contained 1 gallon of latex/sack of cement (gal/sk) of LATEX™ 3000. Diutan gum was added to the sample as indicated and the fluid loss monitored for the test time and the total fluid loss calculated. The results are presented in Table 1.

TABLE 1

FLUID LOSS PERFORMANCE WITH 1 GAL/SK LATEX

| Biopolymer gum concentration in latex (% wt) | Test Time (min) | mL collected | Calc. FL |
|---|---|---|---|
| 0 | 5.5 | 35.5 | 166.5 |
| 0.44 | 13 | 34 | 103 |
| 0.88 | 16.5 | 24 | 64 |

Example 2

Rheological analysis of a latex solution, specifically a 1 gal/sk solution of LATEX™ 3000 was compared to that of a LC-FLAC comprising diutan gum at either 0.44 wt. % or 0.88 wt. % based on the total weight of the sample. Samples were allowed to stir for the indicated time before being fluid loss is measured in accordance with API 10B-2. at the indicated shear rates in revolutions per minute (RPM. The procedure calls for increasing rotational speed and then decreasing speed, referred to as an upsweep, and downsweep. The results are presented in Tables 2-6.

TABLE 2

Latex 3000 ™

| RPM | Up | Down | Average |
|---|---|---|---|
| 3 | 2 | 2 | 2 |
| 6 | 3 | 3 | 3 |
| 30 | 7 | 7 | 7 |
| 60 | 11 | 11 | 11 |
| 100 | 16 | 16 | 16 |
| 200 | 28 | 28 | 28 |
| 300 | 38 | | 38 |

TABLE 3

Latex 3000 ™ w/0.44% wt diutan gum 3 day stir

| RPM | Up | Down | Average |
|---|---|---|---|
| 3 | 20 | 22 | 21 |
| 6 | 28 | 28 | 28 |
| 30 | 54 | 54 | 54 |
| 60 | 76 | 74 | 75 |
| 100 | 98 | 96 | 97 |
| 200 | 141 | 138 | 139.5 |
| 300 | 174 | | 174 |

TABLE 4

Latex 3000 ™ w/0.44% wt diutan gum 4 day stir

| RPM | Up | Down | Average |
|---|---|---|---|
| 3 | 20 | 23 | 21.5 |
| 6 | 27 | 30 | 28.5 |
| 30 | 56 | 57 | 56.5 |
| 60 | 78 | 78 | 78 |
| 100 | 101 | 101 | 101 |
| 200 | 145 | 144 | 144.5 |
| 300 | 180 | | 180 |

TABLE 5

Latex 3000 ™ w/0.88% wt diutan gum 1 day stir

| RPM | Up | Down | Average |
|---|---|---|---|
| 3 | 35 | 39 | 37 |
| 6 | 46 | 48 | 47 |
| 30 | 88 | 88 | 88 |
| 60 | 120 | 120 | 120 |
| 100 | 153 | 153 | 153 |
| 200 | 221 | 221 | 221 |
| 300 | 280 | | 280 |

TABLE 6

Latex 3000 ™ w/0.88% diutan gum 1 week

| RPM | Up | Down | Average |
|---|---|---|---|
| 3 | 51.9 | 61.3 | 56.6 |
| 6 | 67.7 | 64.4 | 66.05 |
| 30 | 113.5 | 99.7 | 106.6 |
| 60 | 150.7 | 136.2 | 143.45 |
| 100 | 188.6 | 175.6 | 182.1 |
| 200 | 276.1 | 265.4 | 270.75 |
| 300 | 335.8 | | 335.8 |

The data in Tables 1-6 demonstrate that the sample viscosity does not continue to change much over time and remains a mobile liquid.

Example 3

The fluid loss of a 16.8 pounds per gallon (ppg) cement slurry containing LATEX 3000™ and diutan gum in the indicated amounts was determined. The fluid loss was determined in accordance with API 10B-2.

TABLE 7

| SAMPLE NUMBER | TOTAL FLUID (GAL/SK) | LATEX 3000 ™ (GAL/SK) | DIUTAN GUM CONCENTRATION (% BWOC) | LATEX 3000 ™ (G/600 ML) | DIUTAN GUM CONCENTRATION (G/600 ML) | DIUTAN GUM/LATEX 3000 ™ (% WT) | TEST TIME (MINS) | MLS COLLECTED | API FL (ML) |
|---|---|---|---|---|---|---|---|---|---|
| 1 | 5.194 | 1 | 0.16 | 60.392 | 1.073 | 1.78% | 30 | 15 | 30 |
| 2 | 5.197 | 1 | 0.08 | 60.409 | 0.536 | 0.89% | 30 | 19 | 38 |
| 3A | 5.199 | 1 | 0.04 | 60.418 | 0.268 | 0.44% | 30 | 24 | 48 |
| 3B | 5.199 | 1 | 0.03 | 60.42 | 0.196 | 0.32% | 19.5 | 31 | 77 |
| 3C | 5.199 | 1 | 0.02 | 60.422 | 0.131 | 0.22% | 11 | 30 | 99 |
| 6 | 5.2 | 1 | 0.00 | 60.427 | 0 | 0.00% | 5.5 | 35.5 | 166.5 |
| 7 | 5.179 | 0 | 0.164 | 0 | 1.074 | — | 12 | 30 | 95 |

Figure 1:
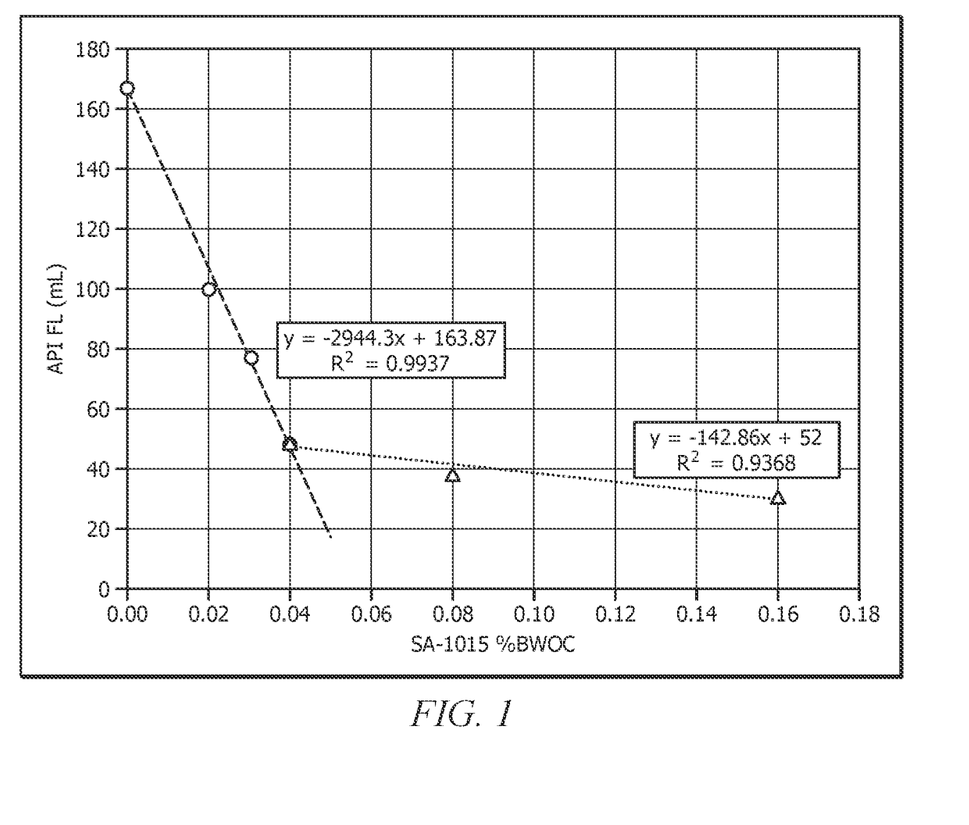
FIG. 1 is a plot of the API fluid loss in mL of a cementitious composition comprising latex (e.g., LATEX 3000™) as a function of diutan gum (e.g., SA-1015) concentration in the composition.

The results are presented in Table 7 and FIG. 1. The results demonstrate the presence of latex and diutan gum resulted in a synergistic effect that dramatically decreased the fluid loss observed for the cement slurry. Advantageously, at a latex to diutan gum ratio of about 60:1 the fluid loss of the sample is decreased by approximately 68% when compared to the fluid loss in the absence of latex or a decrease of approximately 82% when compared to the fluid loss in the absence of diutan gum.

Example 4

Figure 2:
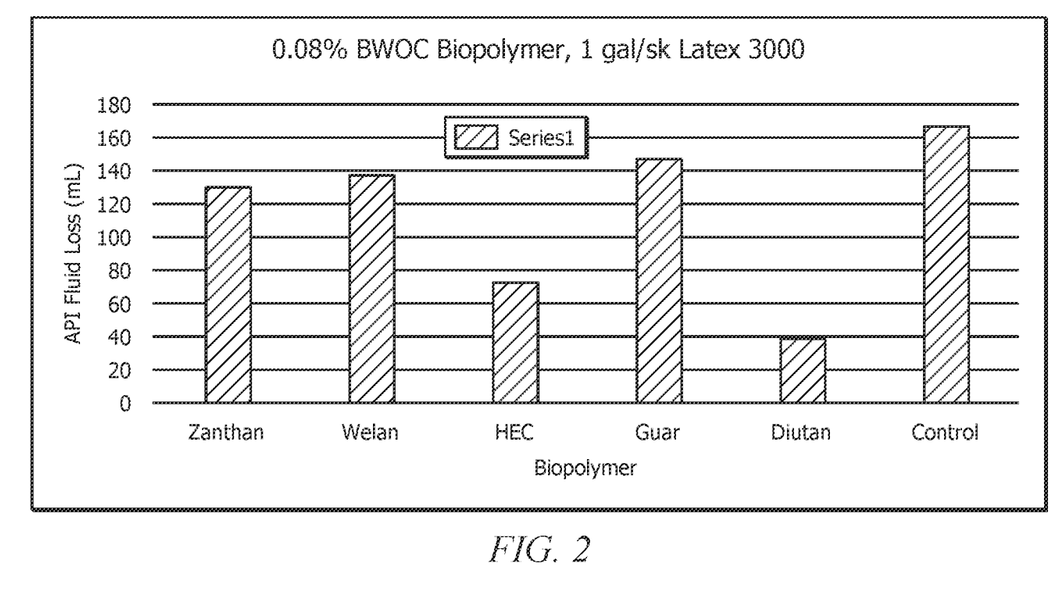
FIG. 2 is a bar graph depicting the API fluid loss in mL of a cementitious composition comprising latex (e.g., LATEX 3000™) and the indicated biopolymer.

The dependence of the fluid loss performance of a LC-FLAC on the biopolymer gum type was investigated. The control sample contained cement, water and either latex or diutan gum. Test samples contained the components of the control sample and 0.08% bwoc of the type of biopolymer gum indicated in Table 8. The results of the fluid loss tests are presented in Table 8 and graphed in FIG. 2.

TABLE 8

| BIOGUM | | TEST TIME (MINS) | MLS COLLECTED | API FL (ML) |
|---|---|---|---|---|
| Xanthan | Barazan ® D ™ | 5.5 | 28 | 130 |
| Welan | SA-640 | 5 | 28 | 137 |
| HEC | FWCA/ WG-17 | 26.5 | 34 | 72 |
| Guar | WG-36 | 6 | 33 | 147 |
| Diutan | SA-1015 | 30 | 19 | 38 |
| Control | — | 5.5 | 35.5 | 166.5 |

The results demonstrate all of the biopolymer gums in the presence of latex reduced the fluid loss of the samples when compared to the control.

ADDITIONAL DISCLOSURE

The following enumerated embodiments of the present disclosures are provided as nonlimiting examples.

A first embodiment which is a liquid additive composition comprising (i) a biopolymer gum and (ii) a latex, wherein a ratio of biopolymer gum to latex ranges from about 1:50 to about 1:500.

A second embodiment which is the liquid additive composition of the first embodiment wherein the ratio of biopolymer gum to latex ranges from about 1:50 to about 1:400.

A third embodiment which is the liquid additive composition of any of the first through second embodiments wherein the ratio of biopolymer gum to latex ranges from about 1:50 to about 1:200.

A fourth embodiment which is the liquid additive composition of any of the first through third embodiments wherein the ratio of biopolymer gum to latex is about 1:50.

A fifth embodiment which is the liquid additive composition of any of the first through fourth embodiments wherein the biopolymer gum has a weight average molecular weight of from about $1\times10^5$ g/mol to about $1\times10^7$ g/mol.

A sixth embodiment which is the liquid additive composition of any of the first through fifth embodiments wherein the biopolymer gum comprises an anionic extracellular polysaccharide derived from one or more polysaccharide monomers.

A seventh embodiment which is the liquid additive composition of the sixth embodiment wherein the one or more polysaccharide monomers comprise glucose, mannose, glucoronic acid, rhamnose, galactose or combinations thereof.

An eighth embodiment which is the liquid additive composition of any of the first through seventh embodiments wherein the biopolymer gum is selected from the group consisting of xanthan gum, welan gum, diutan gum, pullulan gum, guar gum, gellan gum and combinations thereof.

A ninth embodiment which is the liquid additive composition of any of the first through eighth embodiments wherein the biopolymer gum comprises diutan gum.

A tenth embodiment which is the liquid additive composition of any of the first through ninth embodiments wherein the latex comprises repeating units formed from ethylene, propylene, styrene, butadiene, nitrile, neoprene, polybutadiene. acrylonitrile, isoprene, polyisoprene, 2-acrylamido-2-methylpropane sulfonic acid, or combinations thereof.

An eleventh embodiment which is the liquid additive composition of any of the first through tenth embodiments wherein the latex comprises a styrene/butadiene/2-acrylamido-2-methylpropane sulfonic acid rubber.

A twelfth embodiment which is the liquid additive composition of any of the first through tenth embodiments wherein the latex comprises a styrene/butadiene rubber and wherein a ratio of styrene:butadiene ranges from about 25:75 to about 75:25.

A thirteenth embodiment which is the liquid additive composition of any of the first through twelfth embodiments further comprising biocide, antifoaming agents, surfactants or combinations thereof.

A fourteenth embodiment which is the liquid additive composition of any of the first through thirteenth embodiments wherein the latex is an aqueous latex and wherein the liquid additive composition comprises from about 0.1 to about 10 weight percent biopolymer gum, from about 40 to about 50 weight percent latex polymer solids, and from about 40 to about 55 weight percent water, all percentages based on the total weight of the liquid additive composition.

A fifteenth embodiment which is a method of making a liquid additive composition comprising contacting a biopolymer gum and a latex to form a mixture wherein a ratio of biopolymer gum to latex ranges from about 1:50 to about 1:500.

A sixteenth embodiment which is the method of the fifteenth embodiment wherein the mixture is blended to homogeneity.

A seventeenth embodiment which is the method of any of the fifteenth through sixteenth embodiments wherein the biopolymer gum is selected from the group consisting of xanthan gum, welan gum, diutan gum, pullulan gum, guar gum, gellan gum and combinations thereof.

An eighteenth embodiment which is the method of any of the fifteenth through seventeenth embodiments wherein the biopolymer gum is diutan gum.

A nineteenth embodiment which is the method of any of the fifteenth through eighteenth embodiments wherein the latex comprises repeating units formed from isoprene, styrene, acrylonitrile, butadiene, 2-acrylamido-2-methylpropane sulfonic acid or combinations thereof.

A twentieth embodiment which is the method of any of the fifteenth through nineteenth embodiments wherein the latex comprises a styrene/butadiene/2-acrylamido-2-methylpropane sulfonic acid rubber.

A twenty-first embodiment which is a method of servicing a wellbore penetrating a subterranean formation comprising placing a treatment fluid comprising (i) a biopolymer gum and (ii) a latex into the wellbore and/or the subterranean formation, wherein a ratio of biopolymer gum to latex ranges from about 1:50 to about 1:500.

A twenty-second embodiment which is a method of servicing a wellbore penetrating a subterranean formation comprising: forming a treatment fluid comprising the liquid additive of claim 1, and placing the treatment fluid into the wellbore and/or the subterranean formation.

A twenty-third embodiment which is the method of any of the twenty-first through twenty-second embodiments wherein the biopolymer gum is selected from the group consisting of xanthan gum, welan gum, diutan gum, pullulan gum, guar gum, gellan gum and combinations thereof.

A twenty-fourth embodiment which is the method of any of the twenty-first through twenty-third embodiments wherein the latex comprises a styrene/butadiene/2-acrylamido-2-methylpropane sulfonic acid rubber.

A twenty-fifth embodiment which is the method of any of the twenty-first through twenty-fourth embodiments wherein the biopolymer gum comprises diutan gum.

A twenty-sixth embodiment which is the method of any of the twenty-first through twenty-fifth embodiments wherein the treatment fluid further comprises a cement.

A twenty-seventh embodiment which is the method of the twenty-sixth embodiment wherein the cement comprises Portland cements, pozzolana cements, gypsum cements, phosphate cements, high alumina content cements, silica cements, high alkalinity cements, shale cements, acid cements, base cements, magnesia cements, fly ash cement, zeolite cement systems, cement kiln dust cement systems, slag cements, micro-fine cement, metakaolin, or combinations thereof.

A twenty-eighth embodiment which is the method of any of the twenty-sixth through twenty-seventh embodiments wherein the cement is present in the treatment fluid in an amount ranging from about 0.1 wt. % to about 80 wt. % based on the total weight of the treatment fluid.

A twenty-ninth embodiment which is the method of any of the twenty-first through twenty-eighth embodiments, wherein the treatment fluid further comprises a base fluid.

A thirtieth embodiment which is the method of the twenty-ninth embodiment wherein the base fluid comprises fresh water, surface water, ground water, produced water, sea water, salt water, brine, or combinations thereof.

A thirty-first embodiment which is the method of any of the twenty-ninth through thirtieth embodiments wherein the treatment fluid is formulated as a drilling mud.

A thirty-second embodiment which is the method of any of the twenty-ninth through thirtieth embodiments wherein the treatment fluid is formulated as a spacer fluid.

While embodiments of the present disclosure have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A liquid additive composition consisting of (i) a biopolymer gum, (ii) a latex, wherein a ratio of biopolymer gum to latex ranges from about 1:50 to about 1:500, and optionally (iii) additives selected from the group consisting of aqueous fluid, salts, biocides and surfactants.

2. The liquid additive composition of claim 1, wherein the ratio of biopolymer gum to latex ranges from about 1:50 to about 1:400.

3. The liquid additive composition of claim 1, wherein the biopolymer gum has a weight average molecular weight of from about $1\times10^5$ g/mol to about $1\times10^7$ g/mol.

4. The liquid additive composition of claim 1, wherein the biopolymer gum comprises an anionic extracellular polysaccharide derived from one or more polysaccharide monomers.

5. The liquid additive composition of claim 4, wherein the one or more polysaccharide monomers comprise glucose, mannose, glucoronic acid, rhamnose, galactose or combinations thereof.

6. The liquid additive composition of claim 1, wherein the biopolymer gum is selected from the group consisting of xanthan gum, welan gum, diutan gum, pullulan gum, guar gum, gellan gum and combinations thereof.

7. The liquid additive composition of claim 1, wherein the biopolymer gum comprises diutan gum.

8. The liquid additive composition of claim 1, wherein the latex comprises repeating units formed from ethylene, propylene, styrene, butadiene, nitrile, neoprene, polybutadiene, acrylonitrile, isoprene, polyisoprene, 2-acrylamido-2-methylpropane sulfonic acid, or combinations thereof.

9. The liquid additive composition of claim 1, wherein the latex comprises a styrene/butadiene/2-acrylamido-2-methylpropane sulfonic acid rubber.

10. The liquid additive composition of claim 1, wherein the latex is an aqueous latex and wherein the liquid additive composition consists of from about 0.1 to about 10 weight percent biopolymer gum, from about 40 to about 50 weight percent latex polymer solids, from about 40 to about 55 weight percent water, optionally one or more salts, and optionally one or more surfactants, all percentages based on the total weight of the liquid additive composition.

11. A method of preparing the liquid additive composition of claim 1 comprising contacting a (i) biopolymer gum, (ii) a latex, and optionally (iii) additives selected from the group consisting of aqueous fluid, salts, biocides and surfactants to form a mixture wherein a ratio of biopolymer gum to latex ranges from about 1:50 to about 1:500.

12. The method of claim 11, wherein the biopolymer gum is selected from the group consisting of xanthan gum, welan gum, diutan gum, pullulan gum, guar gum, gellan gum and combinations thereof.

13. The method of claim 11, wherein the biopolymer gum is diutan gum and the latex comprises a styrene/butadiene/2-acrylamido-2-methylpropane sulfonic acid rubber.

14. A method of servicing a wellbore penetrating a subterranean formation comprising:
placing a treatment fluid comprising the liquid additive composition of claim 1 into the wellbore and/or the subterranean formation.

15. The method of claim 14, wherein the latex comprises a styrene/butadiene/2-acrylamido-2-methylpropane sulfonic acid rubber and the biopolymer gum comprises diutan gum.

16. The method of claim 15, wherein the latex is an aqueous latex and wherein the liquid additive composition consists of from about 0.1 to about 10 weight percent biopolymer gum, from about 40 to about 50 weight percent latex polymer solids, from about 40 to about 55 weight percent water, optionally one or more salts, and optionally one or more surfactants, all percentages based on the total weight of the liquid additive composition.

17. The method of claim 14, wherein the treatment fluid further comprises a cement.

18. The method of claim 17, wherein the cement comprises Portland cements, pozzolana cements, gypsum cements, phosphate cements, high alumina content cements, silica cements, high alkalinity cements, shale cements, acid cements, base cements, magnesia cements, fly ash cement, zeolite cement systems, cement kiln dust cement systems, slag cements, micro-fine cement, metakaolin, or combinations thereof.

19. The method of claim 17, wherein the treatment fluid has a reduction in fluid loss of from about 10% to about 80% when compared to the fluid loss observed in the presence of a latex fluid loss additive without a biopolymer gum.

20. The method of claim 14, wherein the treatment fluid is formulated as a drilling mud.

21. The method of claim 14, wherein the treatment fluid is formulated as a spacer fluid.

22. The method of claim 14, wherein the treatment fluid has a reduction in fluid loss of from about 10% to about 80% when compared to the fluid loss observed in the presence of a latex fluid loss additive without a biopolymer gum.

* * * * *